Nov. 27, 1951     J. H. KNAPP     2,576,299
INGREDIENT PULVERIZING APPARATUS FOR FOOD PREPARING MACHINES
Original Filed Dec. 17, 1947     2 SHEETS—SHEET 1
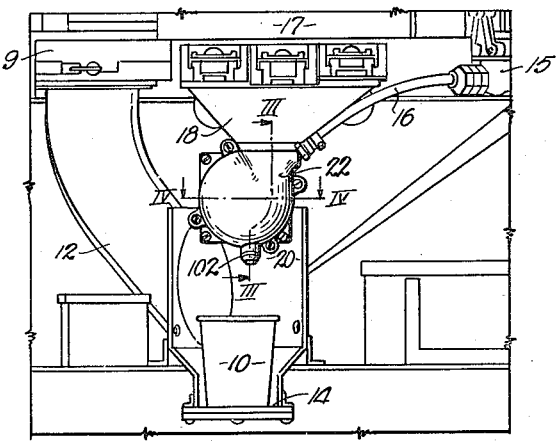
Fig. 1.
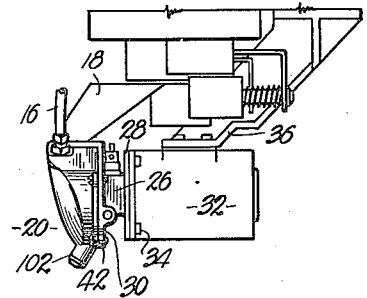
Fig. 2.
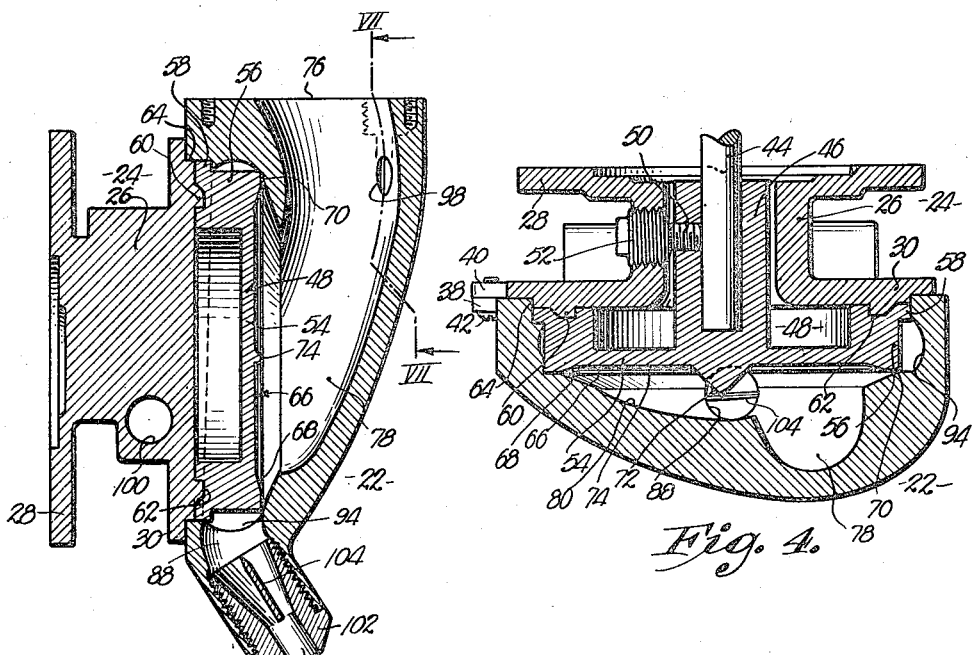
Fig. 3.     Fig. 4.
INVENTOR.
Joseph H. Knapp
BY
ATTORNEY.

INVENTOR.
Joseph H. Knapp
BY
ATTORNEY.

Patented Nov. 27, 1951

2,576,299

UNITED STATES PATENT OFFICE 2,576,299

INGREDIENT PULVERIZING APPARATUS FOR FOOD PREPARING MACHINES

Joseph H. Knapp, Kansas City, Mo., assignor to C. Earl Hovey, Kansas City, Mo., trustee Original application December 17, 1947, Serial No. 792,236. Divided and this application September 13, 1948, Serial No. 48,995

12 Claims. (Cl. 241—245)

This invention relates broadly to machines for automatically vending foods in liquid form, such as soups, coffee and other drinks, the most important object being to provide a pulverizer or crusher for treating pallets of the food to be mixed with water or other liquid.

This is a division of my co-pending application Serial No. 792,236, filed December 17, 1947, which matured into Patent 2,552,856 on May 15, 1951, and entitled "Machine for Automatically Preparing and Vending Liquid Foods."

In the aforesaid co-pending application, a vending machine was set forth, operable to prepare and dispense a liquid food, such as coffee, wherein the coffee itself was preformed into relatively small pellets, as was the sugar and cream, also, selectively dispensed; and in such type of vending machine, an essential part thereof constitutes a crusher or grinder that will quickly and effectively pulverize the pellets directed thereinto and reduce the same to a finely comminuted form for mixing with the hot water or other liquid also dispensed.

The most important object of this invention, therefore, is to provide a crusher for food pellets having a rotor disposed within a specially formed stator or housing for receiving the pellets to be pulverized and quickly discharging the same, but only after the ingredients are sufficiently pulverized to thoroughly mix with the liquid in a minimum amount of time.

Another important object of this invention is the provision of pulverizing apparatus capable of not only crushing food pellets into a fine, powdery form but adaptable to receive the liquid to be mixed with the powdered ingredients simultaneously therewith and for a period after the powder has been dispensed, so that the entire interior of the grinder itself is completely cleansed after each operation.

Another object of this invention is to provide pulverizing apparatus having a rotor and a stator in the form of a housing for receiving the former, provided with opposed grinding faces so disposed as to retard movement of the pellet until the same has been reduced to the desired powdery form.

Another object of this invention is to provide a specially-formed inlet opening and passageway into the interior of the aforesaid grinder housing contoured to gradually direct the pellet toward the grinding faces of the device in a spiral disposed in the direction of rotation of the rotor thereof.

Another object of this invention is to provide an inlet passageway as above described, formed to direct the pellet toward the rotor at an angle and terminating at the innermost end thereof within a spiral recess that progressively decreases in depth as its innermost end is approached.

Another important object of this invention is to provide an outlet for the pulverized ingredients, constituting a space formed between the periphery of the rotor and the surrounding housing therefor that progressively increases in width as the ultimate outlet port of the housing is approached.

A still further object of this invention is to provide a groove within that wall of the housing circumscribing the periphery of the rotor that progressively increases in depth as the outlet opening of the housing is approached.

Other objects of this invention include the precise form of the grinding surfaces of the rotor and stator; the way in which the grinding elements of the rotor cooperate with the inlet passageway in directing the pellet toward the periphery of the rotor; the way in which whirling action is eliminated prior to final discharge of the combined liquid and powdered ingredients; the way in which liquid is directed into the pellet inlet opening; and the manner in which the entire assembly is maintained in a heated condition while the same is placed in operation.

In the drawing:

Fig. 1 is a fragmentary, elevational view of a drink preparing and dispensing machine, showing operatively mounted thereon an ingredient pulverizing apparatus for food preparing machines, made in accordance with the present invention.

Fig. 2 is an edge elevational view thereof.

Fig. 3 is a vertical, cross-sectional view taken on irregular line III—III of Fig. 1.

Fig. 4 is a transverse, cross-sectional view taken on line IV—IV of Fig. 1.

Figure 5:
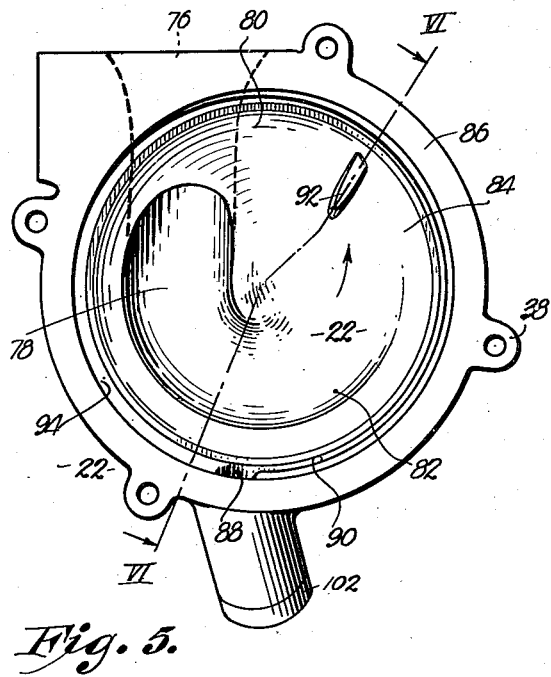
Fig. 5 is an elevational view showing the interior of one section of the housing entirely separated from the remaining parts of the pulverizer.

The vending machine shown fragmentarily in Figs. 1 and 2 includes means (shown in part at 9), for automatically dispensing a cup 10 through an elongated tube 12 to a platform 14 disposed at an accessible point near the front of the machine. This vending machine, also, includes a heated tank (shown partially at 15) for water or other liquid that is dispensed by means of a conduit 16 and apparatus (shown in part at 17), for vending ingredients to be mixed with the hot water in the form of small, spherical pellets. All of the mechanisms for discharging the cup 10, the water and the pellets are automatically set in operation upon insertion of the proper coin into the vending machine through a selected slot.

The machine is so timed and synchronized as to deliver the cup 10 upon insertion of the coin and thereupon vending the selected pellet or pellets, as well as a pre-determined quantity of hot water or other liquid. The pellets are discharged into a hopper 18 that communicates with the pulverizer about to be described.

Such pulverizer includes a hollow housing, broadly designated by the numeral 20, having a stator section 22 and a mounting section 24. The section 24 has a cylindrical hub portion 26 provided with a pair of spaced, outturned flanges 28 and 30. Flange 28 is mounted directly upon one end of an electric motor or other prime mover 32 by means of bolts or the like 34, motor 32 being secured to a bracket 36 forming a part of the vending machine with which the pulverizer is used.

The stator section 22 of housing 20 is cup-shaped and closed by the housing section 24, there being cooperating ears 38 and 40 on sections 22 and 24, respectively, for receiving screws 42, serving to fasten together the two housing sections. The hub portion 26 of section 24 is disposed co-axially with the axis of rotation of drive shaft 44 for motor 32, said shaft 44 extending into a hub 46 of a rotor broadly designated by the numeral 48.

A set screw 50 serves to interconnect the shaft 44 and hub 46, access to said screw 50 being by way of an opening formed in the hub 26 closed by a removable plug 52. In addition to the hub portion 46, rotor 48 includes a circular disc 54 mounted directly upon the innermost end of hub 46 and preferably integral therewith. Disc 54 is provided with an annular flange 56 at its periphery concentric with the hub 46 and in circumscribing relationship thereto.

The annular flange 56 is, in turn, provided with an outturned flange 58 adjacent that end thereof opposite to disc 54, having a periphery that is concentric with hub 46. The diameter of the rotor 48 adjacent the outturned flange 58 thereof is substantially the same as the diameter of the cup-shaped stator section 22 adjacent the open face thereof, as clearly indicated in Fig. 4. Consequently, rotor 48 serves to close the hollow stator section 22 of the housing 20.

An annular rib 60 is formed on the innermost face of the flange 30 of housing section 24 received by an annular groove 62 formed in the proximal face of the annular flange 56 forming a part of rotor 48. It is to be noted that flange 30 is provided with an annular shoulder 64 having substantially the same diameter as the diameter of flange 58, whereby the section 24 tightly fits into the section 22 and overlaps the same, as indicated in Figs. 3 and 4.

The normally innermost face of the rotor 48 has a flat portion 66 that merges into an inclined, annular portion 68 that, in turn, merges with a marginal edge 70 disposed in a plane spaced outwardly and in parallelism with the flange portion 66. A relatively small conical projection 72 is formed on the flat face 66 of rotor 48 at the axis of rotation thereof with the apex of projection 72 extending into the chamber provided by hollow stator section 22.

The innermost face of rotor 48 is, also, provided with a plurality of ribs 74 forming an isosceles trapezoid in cross section and having the outermost, free longitudinal edges thereof in the same plane as the marginal edge 60 of rotor 48. These ribs 74 merge with the inclined portion 68 and terminate adjacent the marginal edge 70.

Figure 8:
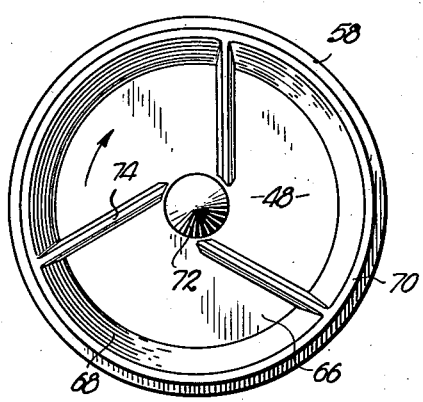
Fig. 8 is a plan view of the rotor, per se, showing the working face thereof.
Figure 7:
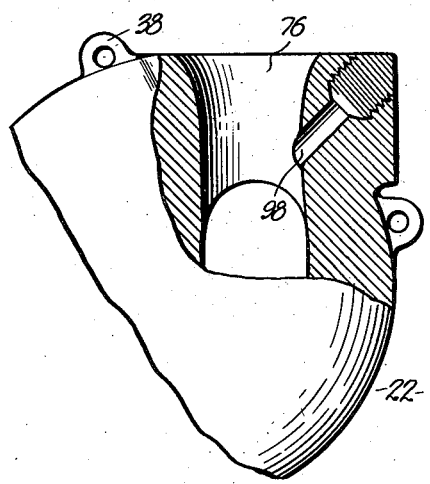
Fig. 7 is a fragmentary, cross-sectional view taken on line VII—VII of Fig. 3.

As clearly illustrated in Fig. 8 of the drawings, the fins or ribs 74, three of which are shown, are disposed with their longitudinal axes on lines defining chords across the face 66 of rotor 48, which chords intersect each other intermediate their ends. In other words, the longitudinal axes of all of the ribs 74 are tangent to the circular base of conical projection 72.

The lowermost end of the hopper 18 communicates directly with an inlet opening 76 formed in the stator section 22, said opening 76 having communication with an elongated passageway 78 extending downwardly and inwardly within the section 22 toward the innermost face of rotor 48. The innermost end of the elongated, inclined conduit or passageway 78 opens through the innermost face 80 of housing section 22 between the axis thereof and its outermost periphery.

As the passageway 78 approaches the face 80 of housing section 22, the same forms a spiral 82 that projects inwardly in the direction of rotation of rotor 48, indicated by arrows in Figs. 5 and 8. This spiral portion 82 progressively decreases in depth as the innermost end thereof is approached until the same merges with face 80 at 84 in substantially diametrically-opposed relationship to the inlet end of passageway 78. The spiral recess or groove 82 is arcuate in cross section, the radius of the arc progressively increasing as the point of merger 84 is approached, where the same flattens out into the relatively flat face 80 of the section 22.

The section 22 of housing 20 is, also, provided with an annular wall 86 that projects laterally from the face or side 80 thereof, wall 86 completely circumscribing the flange portion 56 of the rotor 48. An outlet opening 88 formed in the wall 86 has its longitudinal axis tangent to the axis of rotation of rotor 48 and at an angle outwardly from the section 24, as illustrated in Figs. 3 and 5 of the drawings.

The innermost edge of wall 86 is eccentric with the peripheral edge of flange 56 of rotor 48. At point 90, next adjacent the outlet opening 88, this innermost edge of the wall 86 is in relatively close, almost contacting relationship with the flange 56. From point 90, adjacent the outlet opening 88, the inside diameter of wall 86 progressively increases as the outlet opening 88 is approached in the direction of rotation of rotor 48. Consequently, while the flange portion 56 of rotor 48 is extremely close to the innermost face of wall 86 at the forward side of opening 88, the distance between flange 56 and wall 86 becomes greater as the trailing edge of opening 88 is approached.

Immediately forward of the point of merger 84 between spiral recess 82 and face 80, is disposed a projecting rib 92 which, in effect, is recessed in the same manner as ribs 74 because of the recess 82. This rib 92 is of much the same cross-sectional contour as ribs 74 but is relatively short and is disposed at an angle opposite to the angle of inclination of ribs 74. In other words, rib 92 is disposed within a line drawn chord-like across face 80 intersecting the ribs 74. The outermost, free, flat edges of the rib 74 and the rib 92 are relatively close and in almost contacting engagement.

Figure 6:
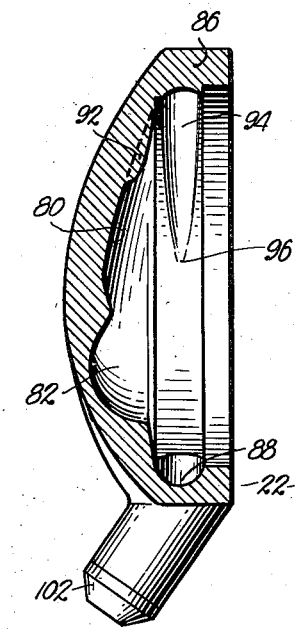
Fig. 6 is a cross-sectional view taken on irregular line VI—VI of Fig. 5, looking in the direction of the arrows.

A recess 94 is, also, formed in the innermost face of the wall 86. This recess 94 is arcuate in cross section, as shown in Figs. 3, 4 and 6 and it commences at point 96, shown in Fig. 6, which point 96 is immediately below the rib 92 and spaced above the point 90. This recess continues from point 96 and communicates directly with the outlet opening 88 at its trailing edge. From point 96, the recess 94 progressively increases in depth as the outlet opening 88 is approached. In other words, the recess 94 being arcuate in cross section, the diameter thereof progressively increases from point 96 to the discharge opening 88.

It is clear from the foregoing that, as a pellet is introduced from hopper 18 into passageway 78 by way of inlet 76, the same will be directed against the flat face 66 of the rotor 48 and, consequently, against the ribs 74. High speed rotation of rotor 48 and the action of the ribs 74 upon the pellet will break the latter into granules of sufficient size to enter the spiral recess or groove 82.

Since groove 82 progressively decreases in depth as point of merger 84 is approached, these granules will be further reduced as the same are directed centrifugally, by the co-action of ribs 74 and the spiral groove 82, toward the periphery of rotor 48. When the granules reach rib 92, the same will be further pulverized by the co-action of ribs 74 and 92 and such action upon the granules will continue until the same reach a sufficiently powdered condition as to permit entrance thereof into the groove 94 between the innermost face of wall 86 and the proximal edge of flange portion 56 of rotor 48.

Since the distance between rotor 48 and wall 86 at the rib 92 is relatively small, only the powdery form of the original pellet will enter the annular groove 94.

Simultaneously with the introduction of the pellet into opening 76, water or other liquid is introduced into the passage 78 from conduit 16, by way of opening 98 disposed immediately below the inlet end 76 of passage 78.

The vending machine itself has its various operating components so synchronized that, after all of the granules of the original pellet have been discharged from the crusher, water or other liquid will continue to flow for a relatively short period of time into passage 78 to thoroughly cleanse the entire interior of the crusher. Sanitation is thereby maintained and no bacteria can form therewithin between cycles of operation.

An elongated opening 100 is formed in the hub portion 26 of the housing section 24 for receiving a heating coil (not shown) for maintaining the entire crusher in a heated condition at a predetermined temperature, to the end that the hot water emanating from conduit 16 will not cool as the same passes through the crusher to the outlet 88 and thence into cup 10.

Since a whirling motion is imparted to the mixture of water and pellet ingredients within the crusher, a plug 102 is provided within the outlet opening 88. Plug 102 is externally threaded to permit removal for cleaning and replacement within the opening 88 and has provided therein a baffle plate 104 that intersects the continuous bore 106 through plug 102.

It is noted that the bore 106 is funnel-shaped with the base end thereof next adjacent the outlet 88 and that the baffle 104 is disposed within the funnel-shaped portion of bore 106. The liquid mixture passing through bore 106 and impinging upon the baffle 104 will cease whirling prior to discharge to the cup 10.

While operation of the device has been made clear through the above description, a summary thereof is as follows:

Material to be crushed, pulverized or comminuted is introduced into hopper 18 for discharge into passageway 78 almost simultaneously with release of a pre-determined quantity of water or other liquid for making a drink, for instance, through nozzle 16 and thence into passage 78 by way of opening 98. The material to be crushed strikes the face 66 of rotor 48, where the same is violently struck by the plurality of angled vanes 74 on face 66.

When the pellet has been broken into granules sufficiently small to enter the spiral groove 82 within face 80 of stator section 22, such granules will be forced toward the single, angularly-disposed rib 92 on face 80 of stator 22. Since the depth of the spiral groove 82 progressively decreases as the rib 92 is approached, the granules will continue to break up as the same pass from passage 78 toward rib 92 through the action of ribs 74.

Ribs 74, because of their particular inclination, cooperate with the spiral formation of groove 82 in directing the granules centrifugally toward the periphery of rotor 48, where the same will strike the rib 92 and be further pulverized by the co-action of ribs 74 and rib 92.

The centrally-disposed conical member 72 at the innermost end of vanes 74 serves to prevent movement of the granules toward the axis of rotation of rotor 48 and thereby, also, cooperate with vanes 74 and spiral groove 82 in forcing such granules to the periphery of rotor 48.

Since the distance between the flat, marginal edge 58 of rotor 48 and the proximal surface of stator section 22 is relatively small, as indicated in Figs. 3 and 4, the material must be in a powdery form before the same can enter the chamber provided by groove 94 circumscribing the flange portion 56 of rotor 48. Even after this powdered form of the ingredients enters the passageway 94, the same will be further treated as rotor 48 moves the granules toward the outlet 88.

The periphery of rotor 48 being relatively close to the innermost face of wall 86 between outlet 88 and point 96 thereon, the granules can only enter the peripheral groove 94 at point 96 and forwardly toward the opposite side of outlet 88.

When the device was placed in actual use, it was found that material can be pulverized and crushed into a fine, powdery form very quickly, particularly because of the fact that the inflow of liquid from conduit 16 aided in forcing the same through the crusher. Such liquid flow prevents clogging at any point within the crusher and, as above stated, serves in completely sanitizing the interior thereof after the powdered ingredients are all discharged into the cup 10.

The particular inclination of ribs 74 on face 66 of rotor 48 prevents clogging of the pellet granules within the housing 20 since there is a constant tendency for such granules to slide along ribs 74 outwardly toward inclined edge 68. The hammering and beating action by ribs 74 upon the pellet and the resulting granules commences immediately when the pellet enters the housing 20. Ribs 74 then beat the granules in the air within housing 20, against the wall forming recess 82, and against the rib 92 until the same reach a sufficiently powdered form as to enter groove 94.

Since the ribs 74 cross with the rib 92, they wipe thereacross and further pulverize such powder that passes therebetween. The fineness of the finished powder is determined by the distance between the flat edge 58 of rotor 48 and the proximal wall of stator 22 which, in turn, is regulated by the distance shaft 44 extends into the hub 46 of rotor 48.

Attention is also called to the cross sectional contour of groove 62 and rib 60, as shown in Figs. 3 and 4. The outermost bevelled edge of groove 62 operates to prevent coagulation of the treated material within groove 62, since such material will tend to move outwardly toward the periphery of rotor 48 by centrifugal force rather than move inwardly toward the hub 46.

The single embodiment of the present invention herein disclosed is subject to many modifications and changes, and all such changes as fairly come within the scope of the appended claims are contemplated hereby.

Having thus described my invention, what I claim as new and desire to secure by Letters Patent is:

1. Pulverizing apparatus comprising a hollow body having an inlet opening; a rotor in the body having an annular peripheral face; a wall forming a part of said body and circumscribing said peripheral face of the rotor; cooperating pulverizing elements on proximal opposed surfaces of said body and of said rotor respectively; and an outlet opening formed in said body and extending through said wall thereof, said peripheral face of the rotor being in close juxtaposition to said wall on one side of the outlet opening and spaced from the wall on the opposite side of the outlet opening, the space between said peripheral face and said wall progressively and uniformly increasing from said one side of the outlet opening to said opposite side of the outlet opening in the direction of rotation of the rotor.

2. Pulverizing apparatus as set forth in claim 1 wherein said surfaces of the rotor and of the body are each provided with an annular, flat, marginal edge, said edges being complementary and in relatively close, facing relationship.

3. Pulverizing apparatus comprising a hollow body having an inlet opening; a rotor in the body having an annular peripheral face; a wall forming a part of said body and circumscribing said peripheral face of the rotor; cooperating pulverizing elements on proximal opposed surfaces of said body and of said rotor respectively; an outlet opening formed in said body and extending through said wall thereof, said peripheral face of the rotor being in close juxtaposition to said wall on one side of the outlet opening and spaced from the wall on the opposite side of the outlet opening, the space between said peripheral face and said wall progressively and uniformly increasing from said one side of the outlet opening to said opposite side of the outlet opening in the direction of rotation of the rotor; and an annular groove formed in said wall in register with said outlet opening and extending from said opposite side of the outlet opening toward said one side of the outlet opening.

4. Pulverizing apparatus as set forth in claim 3 wherein said surfaces of the rotor and of the body are each provided with an annular, flat, marginal edge, said edges being complementary and in relatively close, facing relationship.

5. Pulverizing apparatus comprising a hollow body having an inlet opening; a rotor in the body having an annular peripheral face; a wall forming a part of said body and circumscribing said peripheral face of the rotor; cooperating pulverizing elements on proximal opposed surfaces of said body and of said rotor respectively; an outlet opening formed in said body and extending through said wall thereof, said peripheral face of the rotor being in close juxtaposition to said wall on one side of the outlet opening and spaced from the wall on the opposite side of the outlet opening, the space between said peripheral face and said wall progressively and uniformly increasing from said one side of the outlet opening to said opposite side of the outlet opening in the direction of rotation of the rotor; and an annular groove formed in said wall in register with said outlet opening, said groove extending from said opposite side of the outlet opening toward said one side of the outlet opening, and terminating in spaced relationship to the latter adjacent the innermost end of said inlet opening.

6. Pulverizing apparatus as set forth in claim 5 wherein said surfaces of the rotor and of the body are each provided with an annular, flat, marginal edge, said edges being complementary and in relatively close, facing relationship.

7. Pulverizing apparatus comprising a hollow body having an inlet opening; a rotor in the body having an annular peripheral face; a wall forming a part of said body and circumscribing said peripheral face of the rotor; cooperating pulverizing elements on proximal opposed surfaces of said body and of said rotor respectively; an outlet opening formed in said body and extending through said wall thereof, said peripheral face of the rotor being in close juxtaposition to said wall on one side of the outlet opening and spaced from the wall on the opposite side of the outlet opening, the space between said peripheral face and said wall progressively and uniformly increasing from said one side of the outlet opening to said opposite side of the outlet opening in the direction of rotation of the rotor; and an annular groove formed in said wall in register with said outlet opening, said groove extending from said opposite side of the outlet opening toward said one side of the outlet opening, and terminating in spaced relationship to the latter adjacent the innermost end of said inlet opening, said inlet opening being spiral to progressively diminishing in cross-sectional area as said innermost end thereof is approached.

8. Pulverizing apparatus comprising a hollow body having an inlet opening; a rotor in the body having an annular peripheral face; a wall forming a part of said body and circumscribing said peripheral face of the rotor; cooperating pulverizing elements on proximal opposed surfaces of said body and of said rotor respectively; an outlet opening formed in said body and extending through said wall thereof, said peripheral face of the rotor being in close juxtaposition to said wall on one side of the outlet opening and spaced from the wall on the opposite side of the outlet opening, the space between said peripheral face and said wall progressively and uniformly increasing from said one side of the outlet opening to said opposite side of the outlet opening in the direction of rotation of the rotor; and an annular groove formed in said wall in register with said outlet opening and extending from said opposite side of the outlet opening toward said one side of the outlet opening, said groove progressively increasing in depth as said opposite side of the outlet opening is approached.

9. Pulverizing apparatus as set forth in claim 8 wherein said surfaces of the rotor and of the body are each provided with an annular, flat, marginal edge, said edges being complementary and in relatively close, facing relationship.

10. Pulverizing apparatus comprising a hollow body having an inlet opening; a rotor in the body having an annular peripheral face; a wall forming a part of said body and circumscribing said peripheral face of the rotor; cooperating pulverizing elements on proximal opposed surfaces of said body and of said rotor respectively; an outlet opening formed in said body and extending through said wall thereof, said peripheral face of the rotor being in close juxtaposition to said wall on one side of the outlet opening and spaced from the wall on the opposite side of the outlet opening, the space between said peripheral face and said wall progressively and uniformly increasing from said one side of the outlet opening to said opposite side of the outlet opening in the direction of rotation of the rotor; and an annular groove formed in said wall in register with said outlet opening and extending from said opposite side of the outlet opening toward said one side of the outlet opening, said inlet opening being spiral and progressively diminishing in cross-sectional area as a portion of the groove spaced from the outlet opening is approached.

11. Pulverizing apparatus comprising a hollow body having an inlet opening; a rotor in the body having an annular peripheral face; a wall forming a part of said body and circumscribing said peripheral face of the rotor; cooperating pulverizing elements on proximal opposed surfaces of said body and of said rotor respectively; an outlet opening formed in said body and extending through said wall thereof, said peripheral face of the rotor being in close juxtaposition to said wall on one side of the outlet opening and spaced from the wall on the opposite side of the outlet opening, the space between said peripheral face and said wall progressively and uniformly increasing from said one side of the outlet opening to said opposite side of the outlet opening in the direction of rotation of the rotor; and an annular groove formed in said wall in register with said outlet opening, said groove extending from said opposite side of the outlet opening toward said one side of the outlet opening, and terminating in spaced relationship to the latter adjacent the innermost end of said inlet opening, said groove progressively increasing in depth as said opposite side of the outlet opening is approached.

12. Pulverizing apparatus as set forth in claim 11 wherein said surfaces of the rotor and of the body are each provided with an annular, flat, marginal edge, said edges being complementary and in relatively close, facing relationship.

JOSEPH H. KNAPP.

REFERENCES CITED

The following references are of record in the file of this patent:

UNITED STATES PATENTS

| Number | Name | Date |
|---|---|---|
| 281,814 | Wilson | July 24, 1883 |
| 281,887 | Kimplen | July 24, 1883 |
| 322,400 | Straub | July 14, 1885 |
| 346,108 | Iler et al. | July 27, 1886 |
| 647,757 | Morse | Apr. 17, 1900 |
| 764,071 | Patch | July 5, 1904 |
| 777,410 | Gaisser | Dec. 13, 1904 |
| 901,770 | Anthony | Oct. 20, 1908 |
| 1,394,082 | Greene | Oct. 18, 1921 |
| 1,494,684 | Gross | May 20, 1924 |
| 1,499,233 | Lenart et al. | June 24, 1924 |
| 1,727,410 | Poesse | Sept. 10, 1929 |
| 1,993,762 | Tolman | Mar. 12, 1935 |

FOREIGN PATENTS

| Number | Country | Date |
|---|---|---|
| 21,292 | Germany | Apr. 20, 1883 |
| 455,263 | Great Britain | Oct. 16, 1936 |
| 701,742 | Germany | Jan. 23, 1941 |